United States Patent Office 2,971,861
Patented Feb. 14, 1961

2,971,861

SURFACE TREATMENT PROCESS

John D. Reese, Santa Monica, and Simon J. Sluter, Los Angeles, Calif., assignors to Rock Fabricates and Mining Corporation, Beverly Hills, Calif., a corporation of California No Drawing. Filed June 14, 1954, Ser. No. 436,700

15 Claims. (Cl. 117—54)

Our invention relates to the treatment of various surfaces and particularly to treatment providing decorative color and finish, sealing and promotion of bonding of various materials.

A great variety of materials are employed as aggregates, fillers, surface dressings, reinforcing agents, thermal and electrical insulation agents in the production of various manufactured items as, for example, in molded plastic, laminated plastic and other structural compositions. It is advantageous to treat such materials to enhance decorative and utilitarian properties whereby the appearance and serviceability of the finished item are improved.

We have now discovered a surface treatment process which is applicable to a wide variety of such surfaces thereby providing improved decorative and utilitarian values. Briefly our process usually includes a preliminary passivation treatment which prepares the surface for subsequent color treatment and which promotes bonding and adhesion of certain media used in later stages of the process. Alternative dye-coupling and color-developing treatments may then be employed to produce a wide variety of colors and decorative effects. Thereafter, the treated material may be incorporated with thermosetting, either heat or cold setting, and thermoplastic resins as well as with other binders such as drying oils and natural resins in forming a wide variety of items. In certain cases the surface finished item may also be subjected to the process or the colored and sealed material used as a surface dressing, etc.

It is therefore an object of the present invention to provide a surface treatment for various materials.

It is another object of our invention to provide a decorative surface treatment for various materials.

Still another object of our invention is to provide a process for coloring a wide variety of materials.

A further object of our invention is to provide a surface treatment process for promoting the bonding of various materials.

A still further object of our invention is to provide a surface treatment for various aggregates, fillers and the like to provide enhanced appearance and improved utilitarian properties of items manufactured therefrom.

Another important object of our invention contemplates the treatment of surfaces of finished items to improve the appearance and serviceability thereof.

The invention possesses other objects and features of advantage, some of which, with the foregoing, will be set forth in the following description of the preferred form of the invention. It is to be understood, however, that variations therein may be adapted within the scope of the invention as set forth in the claims.

As noted hereinbefore our process is applicable to the treatment of a wide variety of surfaces. Mineral, metallic and organic materials in general are suitable for treatment in accordance with the invention. The process may be used to treat natural and synthetic minerals, mineral oxide, fused materials such as glass, industrial cinders, volcanic stones and cinders, volcanic ash, brick, stone, tile including siliceous and silicates, wood, wood products, putty and artificial woods, cements and concrete; organic materials such as cellulose, metals and metallic fragments; and metallic surfaces such as aluminum and plated surfaces. Moreover the material may be in any form, e.g., granular, porous, glossy, blown, filamented, spongy, plane surface, etc. All that is required in the latter is that there be a substantially solid surface however finely divided.

To prepare the material for the passivation treatment, soluble materials and fines are removed by washing with water as may be required and the material is dried by application of heat. Passivation is then accomplished by treatment with a strongly oxidizing acidic solution. More particularly, passivation may be accomplished by treating the material with a heated solution of chromic acid. In practice, a solution of about 10% chromic acid employed at a temperature of about 180 to 200° F. has been found satisfactory with metals, e.g. aluminum, steel, cadmium plated steel and magnesium. Less severe conditions are required with other materials including organic materials.

As a result of this treatment the surface if not already in a receptive state is left in a modified and receptive state which is necessary for proper dye coupling in later steps of the process. It is contemplated that a similar result can be obtained by the use of equivalent agents, such as potassium, permanganate, potassium dichromate and hydrofluoric acid. When chromic acid is employed as the passivation agent it has been found convenient to employ the term "chromatization" to indicate the passivation treatment. The appearance of the chromatized material is highly variable, ranging from a metallic sheen to amorphous. In addition to providing for proper dye coupling this treatment also promotes bonding by resinous materials as described more fully hereinafter.

Subsequent to the passivation treatment, dye coupling is obtained through the use of a solution of a water soluble silicone, such as sodium methyl siloxanate, commonly known as sodium methyl siliconate which is commercially available under the designation, G.E. SC–50, into which solution there is incorporated about 1–10% of one of the dye couplers listed in the following table. Mixtures of dye couplers will, of course, give a modified color. Advantageously, the process is carried out in a highly caustic solution, i.e., at a pH in the range of about 9 to 13 giving a silicone sealed surface with minimum weight addition.

| Coupler | Resulting color Range |
|---|---|
| 0-hydroxyl-diphenyl | |
| 2,4-dichloro-alpha-naphthol | green. |
| 4-chloro-ortho-phenylphenol | tan. |
| 1,5 dihydroxy 2,6 dibromonaphthalene | blue. |
| para-nitrophenylacetonitrite | |
| b-naphthylacetonitrite | blue. |
| 2-cyano acetyl coumarone | magenta. |
| 1-para nitrophenyl 3 methyl 5 pyrazolone | red. |
| 2-5, dichloroaceto acetanilide | |
| aceto acetanilide | |
| b-nephthoyl acetone | orange. |
| benzoyl acetanilide | yellow. |

The dye coupler-siliconate solution may be contacted with the surface to be treated by any appropriate means. In practice the material may either be dipped into the solution or the solution may be sprayed upon the surface and the solution adhering thereto is allowed to dry. Alternatively, the dye coupler may be applied in a water solution followed by siliconization with a water soluble silicone material, such as those above mentioned. However, in this case, drying is considerably slower. In any event, a siliconized deposit of dye coupler or developer remains on the surface of the material being treated.

To activate the dye coupler, the dry material carrying the siliconized deposit of dye coupler is dipped in a solution of a weak acid. Acetic acid of about 5–10% concentration or other weak organic acids in equivalent concentration have been found satisfactory for this purpose.

Following activation the material is treated with a developer solution. Such developer solution may be provided similarly to the dye coupling solution through the use of sodium methyl siliconate solution having about 5–10% of one of the following developers incorporated therein:

Developer p-Phenylene diamine hydrochloride
2-Amino 5 diethylaminotoluene hydrochloride
p-Amino diethylaniline hydrochloride
Monobenzo-p-aminophenol Such developer solution may be applied by either dipping or spraying as described above whereupon drying produces an adherent color coating on the surface. Variations in dye coupler solution concentrations regulate the depth of color. After color development, plane surfaces may be shot-peened, sand blasted lightly or given other mechanical treatment to produce different finish effects without undue disturbance of the color coat. Regulation of the silicone content in the foregoing solution allows the surface gloss to be controlled through flat, semi-gloss to highly reflective. Subsequent treatment with a water insoluble silicone such as that distributed by the Dow Corning Corporation under the designation DC–200 or DC–710, provides a final finish which is water repellent and provides lowered ignitability. Additional details as to the composition of the materials, DC–200 and DC–710, are disclosed on page 179, "Handbook of Material Trade Names," Zimmerman and Lavine, published by Industrial Research Service, in 1953. These materials belong to the general class which is conventionally termed "silicone fluids."

Particulate inorganic non-metallic materials, i.e., granular, fibrous, etc., such as cinder, porous matrix, aggregate, oxide or fused materials, in a finished form resulting from the above treatment may be employed for a great many purposes. Low density materials may be employed for sound and thermal insulation while the granular, particularly, granular porous materials can be employed in forming structural compositions including roofing materials. By virtue of the water-repellency provided by the siliconization and decorative color effect granular materials may be quite advantageously used as top dressing for roofing surfaces.

Although the defined process is stated to first have the coupler applied to the surface, and then the developer, we have obtained satisfactory results by applying the developer prior to the coupler, or by applying them simultaneously.

As a result of the foregoing treatment, treated particulate or fibrous materials develop a remarkable affinity for a wide variety of thermosetting resins. Accordingly, such resins, e.g., phenolic, epoxy, melamine, silicone, maleic, phthalic, and others, may be applied to provide additional protection to the surface of the dyed material or may be employed as an adhesive or binder for forming manufactured items from the treated material.

More particularly treated particulate or fibrous materials, prepared as described above, may be incorporated into compositions, with or without other solid materials, in which the uncured resin is present. Upon forming by the customary molding, laminating or coating process, with the application of heat such compositions are cured, i.e., thermoset yielding the desired object or structural form. In the event that the treated material was a granular, cellular, low-density material and minor portions of resin with low forming pressures are employed, there is obtained a low-density, sound and thermal insulating form of fair structural strength. If more resin and higher forming pressures are employed, there is obtained a hard, rigid form having a highly decorative surface finish and extreme durability. The use of neutral color resin assures the maximum realization of the color values. It must be appreciated that certain types of surfaces to which the process of passivation is not applicable, may be treated by coupler and developer as indicated above without prior passivation. In addition some surfaces are naturally in a passivated state.

What is claimed is:

1. A surface treatment process comprising treating the surface with a chromic acid solution, to place the surface in a receptive state, then treating the surface with an alkaline solution of sodium methyl siliconate and a dye coupler selected from the group consisting of O-hydroxyl-diphenyl
2,4-dichloro-alpha-naphthol
4-chloro-ortho-phenylphenol
1,5 dihydroxy 2,6 dibromonaphthalene Para-nitrophenylacetonitrile
b-Naphthylacetonitrile
2-cyano acetyl coumarone
1-para nitrophenyl 3 methyl 5 pyrazolone
2-5, dichloroaceto acetanilide Acetoacetanilide
b-Naphthoyl acetone
Benzoyl acetanilide activating the dye coupler by treatment with a solution of weak acid, drying the surface to produce a deposit of siliconized dye coupler thereon, then treating the surface with a solution of sodium methyl siliconate and a color developer selected from the group consisting of p-Phenylene diamine hydrochloride
2-amino 5 diethylaminotoluene hydrochloride
p-Amino diethylaniline hydrochloride
Monobenzo-p-aminophenol, and drying said surface to develop said color and a siliconate finish thereon.

2. A process for producing a finished colored surface on an inorganic non-metallic material comprising treating the surface with a heated solution of about 10% chromic acid concentration, treating the surface with about a 2 to 10% solution of a dye coupler selected from the group consisting of O-hydroxyl-diphenyl
2,4-dichloro-alpha-napthol
4-chloro-ortho-phenylphenol
1,5 dihydroxy 2,6 dibromonaphthalene Para-nitrophenylacetonitrile
b-Naphthylacetonitrile
2-cyano acetyl coumarone
1-para nitrophenyl 3 methyl 5 pyrazolone
2-5 dichloroaceto acetanilide Acetoacetanilide
b-Naphthoyl acetone
Benzoyl acetanilide applying a water soluble silicone material to the surface by deposition from an aqueous solution, activating the dye coupler with a solution of weak acid, drying the surface to produce a deposit of siliconized dye coupler thereon, then treating the surface with a solution of siliconate and about 5–10% of a color developer selected from the group consisting of p-Phenylene diamine hydrochloride
2-amino 5 diethylaminotoluene hydrochloride
p-Amino diethylaniline hydrochloride
monobenzo-p-aminophenol, and drying said surface to develop said color and a siliconate finish thereon.

3. The process as defined in claim 1 wherein said alkaline solution of siliconate and dye coupler has a pH in the range of about 9 to 13.

4. The process as defined in claim 1 wherein said alkaline solution of siliconate and dye coupler has a pH in the range of about 9 to 13 and the concentration of dye coupler is in the range of about 2 to 10%.

5. In a process for forming items containing particulate inorganic non-metallic materials, the steps comprising treating the surface with a chromic acid solution, then treating the surface with an alkaline solution of a water soluble siliconate and a dye coupler selected from the group consisting of O-hydroxyl-diphenyl
2,4-dichloro-alpha-naphthol
4-chloro-ortho-phenylphenol
1,5 dihydroxy 2,6 dibromonaphthalene Para-nitrophenylacetonitrite
b-Naphthylacetonitrite
2-cyano acetyl coumarone
1-para nitrophenyl 3 methyl 5 pyrazolone
2-5, dichloroaceto acetanilide Acetoacetanilide
b-Naphthoyl acetone
Benzoyl acetanilide, activating the dye coupler by treatment with a solution of weak acid, drying said surface to produce a deposit of siliconized dye coupler thereon, then treating the surface with a solution of siliconate and about 2 to 10% of a color developer selected from the group consisting of p-Phenylene diamine hydrochloride
2-amino 5 diethylaminotoluene hydrochloride
p-Amino diethylaniline hydrochloride
Monobenzo-p-aminophenol, drying said surface to develop said color and a siliconate finish thereon, and then bonding a thermosetting resin to the surface.

6. In a process for producing a color upon a surface, the steps comprising: treating said surface with a strong oxidizing agent solution, applying an alkaline solution of a water-soluble siliconate having dissolved therein a dye coupler selected from the group consisting of O-hydroxyl-diphenyl
2,4-dichloro-alpha-naphthol
4-chloro-ortho-phenylphenol
1,5 dihydroxy 2,6 dibromonaphthalene Para-nitrophenylacetonitrite
b-Naphthylacetonitrite
2-cyano acetyl coumarone
1-para nitrophenyl 3 methyl 5 pyrazolone
2-5, dichloroaceto acetanilide Acetoacetanilide
b-Naphthoyl acetone
Benzoyl acetanilide to said surface, applying an aqueous solution of weak organic acid to said surface to activate said coupler, drying the surface to produce a siliconized deposit of dye coupler on said surface, then applying an aqueous solution of a water soluble siliconate having dissolved therein a developer selected from the group consisting of p-Phenylene diamine hydrochloride
2-amino 5 diethylaminotoluene hydrochloride
p-Amino diethylaniline hydrochloride
Monobenzo-p-aminophenol and drying said surface to develop said color thereon.

7. The process as defined in claim 6 wherein said surface comprises an inorganic non-metallic material and said oxidizing agent is a material selected from the group consisting of chromic acid, potassium permanganate and potassium dichromate.

8. A process for producing a colored finish on the receptive surface of an inorganic non-metallic particulate material comprising treating said surface with an alkaline solution of sodium methyl siliconate and a dye coupler selected from the group consisting of O-hydroxyl-diphenyl
2,4-dichloro-alpha-naphthol
4-chloro-ortho-phenylphenol
1,5 dihydroxy 2,6 dibromonaphthalene Para-nitrophenylacetonitrite
b-Naphthylacetonitrite
2-cyano acetyl coumarone
1-para nitrophenyl 3 methyl 5 pyrazolone
2-5, dichloroaceto acetanilide Acetoacetanilide
b-Naphthoyl acetone
Benzoyl acetanilide activating said dye coupler by treatment with a weak organic acid solution, drying said surface to produce a siliconized deposit of dye coupler thereon, applying an aqueous solution of sodium methyl siliconate having dissolved therein a developer selected from the group consisting of p-Phenylene diamine hydrochloride
2-amino 5 diethylaminotoluene hydrochloride
p-Amino diethylaniline hydrochloride
Monobenzo-p-aminophenol to said surface, and drying said surface to develop said color and a siliconate finish thereon.

9. The process as described in claim 8 but wherein said alkaline solution of siliconate and dye coupler has a pH in the range of about 9 to 13.

10. The process as described in claim 8 but wherein said alkaline solution has a pH in the range of about 9 to 13, and said weak organic acid comprises acetic acid of about 5 to 10% concentration.

11. The process as described in claim 8 wherein the concentration of dye coupler in said alkaline siliconate solution is in the range of about 1 to 10% and the developer has a concentration in the range of about 5 to 10% in said sodium methyl siliconate.

12. The product obtained by the operation of the process of claim 8.

13. A process for producing a colored finish on the receptive surface of an inorganic non-metallic particulate material comprising treating said surface with an alkaline solution of sodium methyl siliconate and a dye coupler selected from the group consisting of O-hydroxyl-diphenyl
2,4-dichloro-alpha-naphthol
4-chloro-ortho-phenylphenol
1,5 dihydroxy 2,6 dibromonaphthalene Para-nitrophenylacetonitrite
b-Naphthylacetonitrite
2-cyano acetyl coumarone
1-para nitrophenyl 3 methyl 5 pyrazolone
2-5, dichloroaceto acetanilide Acetoacetanilide
b-Naphthoyl acetone
Benzoyl acetanilide activating said dye coupler by treatment with a weak organic acid solution, drying said surface to produce a siliconized deposit of dye coupler thereon, applying an aqueous solution of sodium methyl siliconate having dissolved therein a developer selected from the group consisting of p-Phenylene diamine hydrochloride
2-amino 5 diethylaminotoluene hydrochloride
p-Amino diethylaniline hydrochloride
Monobenzo-p-aminophenol to said surface, drying said surface to develop said color and a siliconate finish thereon, and applying a silicone fluid to said surface to increase the water repellency thereof.

14. A process for producing a colored finish on the receptive surface of an inorganic non-metallic particulate material comprising treating said surface with an alkaline solution of sodium methyl siliconate and a dye coupler selected from the group consisting of O-hydroxyl-diphenyl
2,4-dichloro-alpha-naphthol
4-chloro-ortho-phenylphenol
1,5 dihydroxy 2,6 dibromonaphthalene Para-nitrophenylacetonitrite
b-Naphthylacetonitrite
2-cyano acetyl coumarone
1-para nitrophenyl 3 methyl 5 pyrazolone
2-5, dichloroaceto acetanilide Acetoacetanilide
b-Naphthoyl acetone
Benzoyl acetanilide activating said dye coupler by treatment with a weak organic acid solution, drying said surface to produce a siliconized deposit of dye coupler thereon, applying an aqueous solution of sodium methyl siliconate having dissolved therein a developer selected from the group consisting of p-Phenylene diamine hydrochloride
2-amino 5 diethylaminotoluene hydrochloride
p-Amino diethylaniline hydrochloride
Monobenzo-p-aminophenol to said surface, drying said surface to develop said color and a siliconate finish thereon, applying an uncured thermosetting resin to said material, and heating said material to cure said resin on the surface thereof.

15. A process for producing a colored finish on the receptive surface of an inorganic non-metallic particulate material and fabricating articles therefrom comprising treating said surface with an alkaline solution of sodium methyl siliconate and a dye coupler selected from the group consisting of O-hydroxyl-diphenyl
2,4-dichloro-alpha-naphthol
4-chloro-ortho-phenylphenol
1,5 dihydroxy 2,6 dibromonaphthalene Para-nitrophenylacetonitrite
b-Naphthylacetonitrite
2-cyano acetyl coumarone
1-para nitrophenyl 3 methyl 5 pyrazolone
2-5, dichloroaceto acetanilide Acetoacetanilide
b-Naphthoyl acetone
Benzoyl acetanilide activating said dye coupler by treatment with a weak organic acid solution, drying said surface to produce a siliconized deposit of dye coupler thereon, applying an aqueous solution of sodium methyl siliconate having dissolved therein a developer selected from the group consisting of p-Phenylene diamine hydrochloride
2-amino 5 diethylaminotoluene hydrochloride
p-Amino diethylaniline hydrochloride
Monobenzo-p-aminophenol to said surface, drying said surface to develop said color and a siliconate finish thereon, admixing a resin binder with said particulate material, forming the admixture, and heating the formed admixture to set the resin.

References Cited in the file of this patent
UNITED STATES PATENTS

| | | |
|---|---|---|
| 1,082,161 | Lang | Dec. 23, 1913 |
| 1,962,339 | Cotton | June 12, 1934 |
| 2,393,640 | King | Jan. 29, 1946 |
| 2,494,920 | Warrick | Jan. 17, 1950 |
| 2,574,225 | Ringk | Nov. 6, 1951 |

FOREIGN PATENTS

| | | |
|---|---|---|
| 525,734 | Great Britain | Sept. 3, 1940 |
| 255,710 | Switzerland | Feb. 1, 1949 |

OTHER REFERENCES

"Synthetic Dyes," by Ven Kataraman, pages 210–215, 237 and 1202, published 1952.